United States Patent [19]
Ott et al.

[11] 4,323,733
[45] Apr. 6, 1982

[54] RANGE EXTENDER WITH VARIABLE GAIN FOR COIN TELEPHONE LOOPS

[75] Inventors: Henry W. Ott, Livingston; Bernard A. Tilson, Parsippany, both of N.J.

[73] Assignee: Bell Telephone Laboratories, Inc., Murray Hill, N.J.

[21] Appl. No.: 211,425

[22] Filed: Nov. 28, 1980

[51] Int. Cl.³ .......................................... H04M 17/02
[52] U.S. Cl. ................................ 179/6.3 R; 179/16 F
[58] Field of Search .................. 179/6.3 R, 6.5, 16 F, 179/16 E, 16 EA

[56] References Cited

U.S. PATENT DOCUMENTS

| | | | |
|---|---|---|---|
| 3,843,844 | 10/1974 | Schumperli | 179/16 F |
| 3,872,258 | 3/1975 | Chambers, Jr. | 179/16 F |
| 3,906,162 | 9/1975 | Sparrevohn | 179/16 F |
| 4,031,324 | 6/1977 | Dudonis | 179/6.3 R |

OTHER PUBLICATIONS

"A Circuit that Stretches Coin Telephone Service", *Bell Laboratories Record*, vol. 51, #4, Apr. 1973, Schillo.

*Primary Examiner*—Gerald L. Brigance
*Attorney, Agent, or Firm*—R. O. Nimtz

[57] ABSTRACT

A range extender with gain unit for coin telephone loops is disclosed. When coin control signals to be applied from a central office to the coin loop are detected, an amplifier circuit and a line feed circuit connected to the loop are disconnected thereby directly connecting the central office with the coin telephone. After coin control is completed, the amplifier and line feed circuit are reinserted into the coin loop. Coin tests and off-hook detection are aided by the use of circuits which draw current from the central office.

11 Claims, 7 Drawing Figures

RANGE EXTENDER WITH VARIABLE GAIN FOR COIN TELEPHONE LOOPS

BACKGROUND OF THE INVENTION

1. Field of the Invention

This invention relates to telephone signal transmission over subscriber loops and, more particularly, to range extension with gain for coil telephone loops.

2. Description of the Prior Art

On long subscriber loops, voice frequency signals are attenuated and direct current supervisory signals fall below the threshold value of central office detectors. These signals are aided by providing voice frequency gain and signaling range extension, respectively, in devices called range extenders with gain (REG). One such REG unit is disclosed in U.S. Pat. No. 4,282,407, issued Aug. 4, 1980, and assigned to the same assignee as the application herewith.

When a REG unit is used in a subscriber loop, the central office is directly connected with the telephone during the idle state ("on-hook"). When the telephone is detected to be "off-hook," an amplifier is switched into the path of the telephone signals and its gain is automatically set, based on the resistance of the loop. Such a REG unit, however, cannot be used with coin telephone loops because a coin control signal may be intepreted as an off-hook signal, causing the insertion of the amplifier into the coin loop. A transformer in the REG unit would then block direct current supervisory signals which control the collection or return of coins and which test for the presence of coins. Further, REG units do not aid coin tests, do not aid ground start, and do not transmit polarity reversals of battery from the central office, all required to operate the coin telephone.

SUMMARY OF THE INVENTION

In accordance with the illustrative embodiment of the present invention, whenever the removal of direct current transmitted from a central office to a coin telephone is detected, any voice frequency device connected to the loop is bypassed, thereby directly connecting the central office with the coin telephone to transmit direct current supervisory signals for controlling the coin telephone. Such a direct connection prevents any possible blockage of direct current signals, thereby avoiding expensive and complex circuits for regenerating and repeating these signals. Further, coin control signals may be transmitted on either the tip conductor alone or on both tip and ring conductors.

Tests for detecting the presence of coins are aided by the temporary connection of resistors between ground and either the ring or the tip conductor to draw additional current through central office detectors.

A feature of the present invention is the ability to disable the REG current detectors when the voltage supplies to the line feed circuit fail in order to prevent relays in the coin REG unit from uncontrolled opening and closing.

An advantage of the present invention is the ability to function with either the ground-start or the loop-start method of call origination, i.e., with either "coin first" or "dial tone first" methods of call origination.

Another advantage of the present invention resides in the ability to transmit central office polarity reversals to the coin telephone, to prevent fraud by disabling the touch-tone pad during coin deposit by the caller, and to clear the totalizer.

Yet another advantage of the present invention is the ability to vary the current in the loop in accordance with the loop length and particularly to protect the circuit from damage due to short circuit currents.

DETAILED DESCRIPTION

Figure 1:
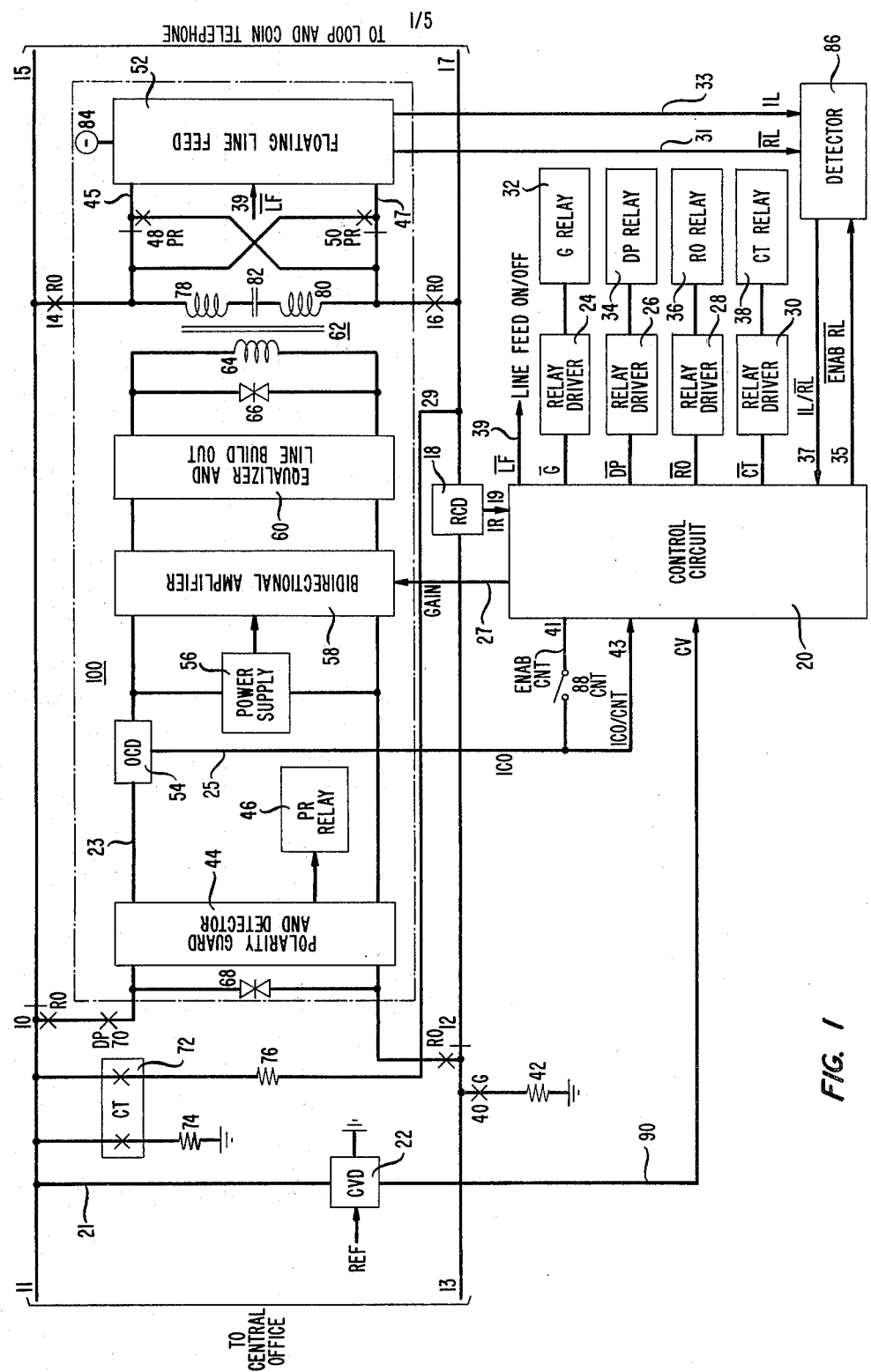
FIG. 1 is a block diagram of the coin range extender with gain unit.

A range extender with gain circuit for a coin loop (coin REG) for use in both electronic and electromechanical telephone central offices is shown in FIG. 1. Conductors 11,13 connect a central office (not shown) with the coin REG. Conductors 15,17 connect the coin REG with a coin telephone (not shown) through a loop (also not shown). For the purpose of this invention, the loop is assumed to be long, i.e., between 1000Ω and 2800Ω.

In the idle state, conductors 11 and 15 are connected directly together through RO contacts 10. Also in the idle state, conductors 13 and 17 are connected together through RO contacts 12 and a low impedance ring current detector (RCD) 18. In accordance with customary telephone usage, conductors 11,15 form the tip (T) conductor and conductors 13,17 form the ring (R) conductor of the coin telephone loop.

In the loop start method of call origination, when a caller at the coin telephone goes off-hook by removing the handset from the cradle, thereby releasing the switchhook and closing the circuit with the central office, current flows from the central office through ring conductor 13, ring current detector 18, and ring conductor 17 to the coin telephone (not shown). In ground start, the sequence described hereinabove will not occur until the caller has deposited an initial rate in the coin telephone. Ring current detector 18 is sufficiently sensitive to detect this "off-hook" current flow for the longest loop.

Figure 6:
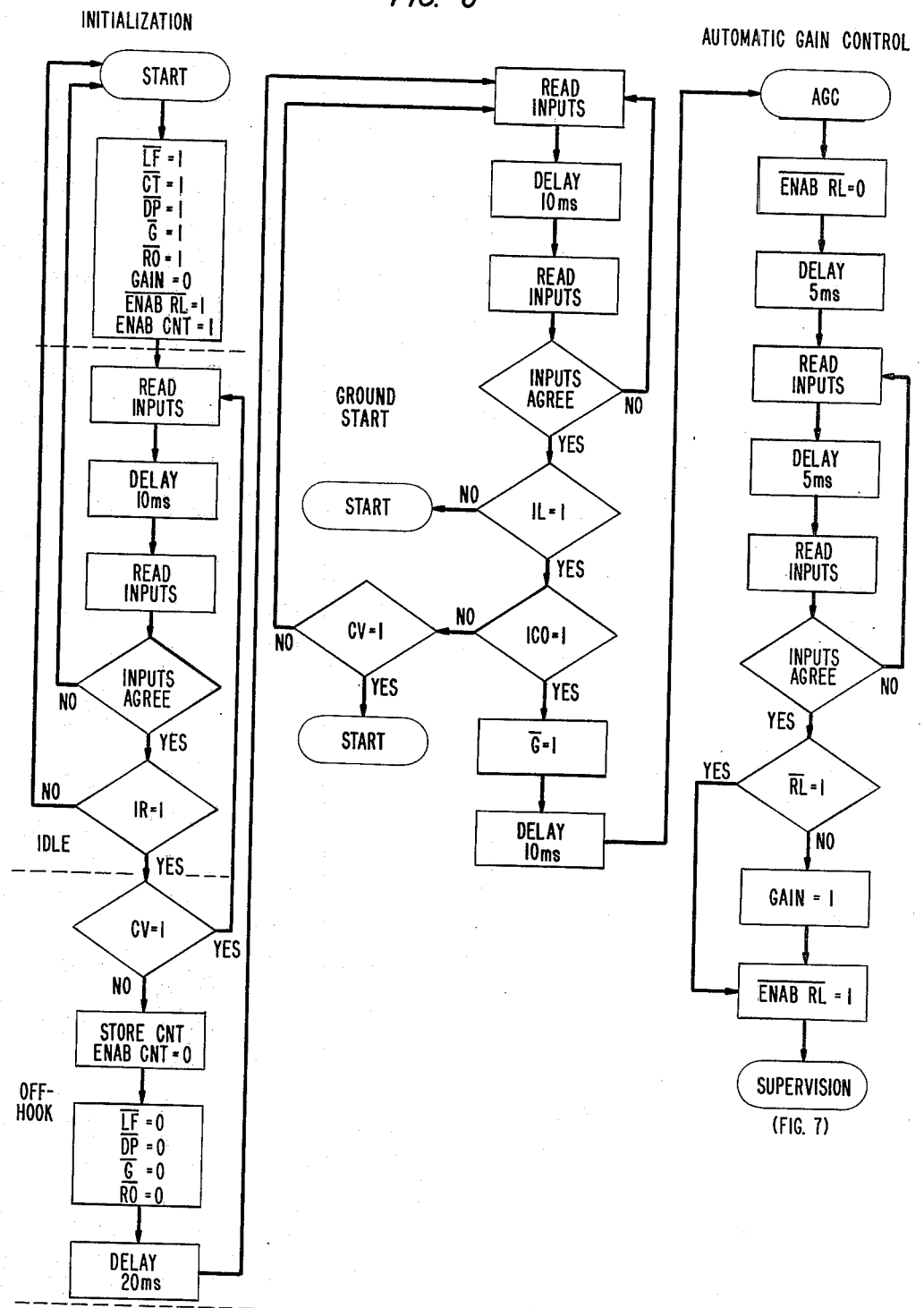
FIG. 6 is a flow chart of some functions performed by control circuit 20 of FIG. 1.
Figure 7:
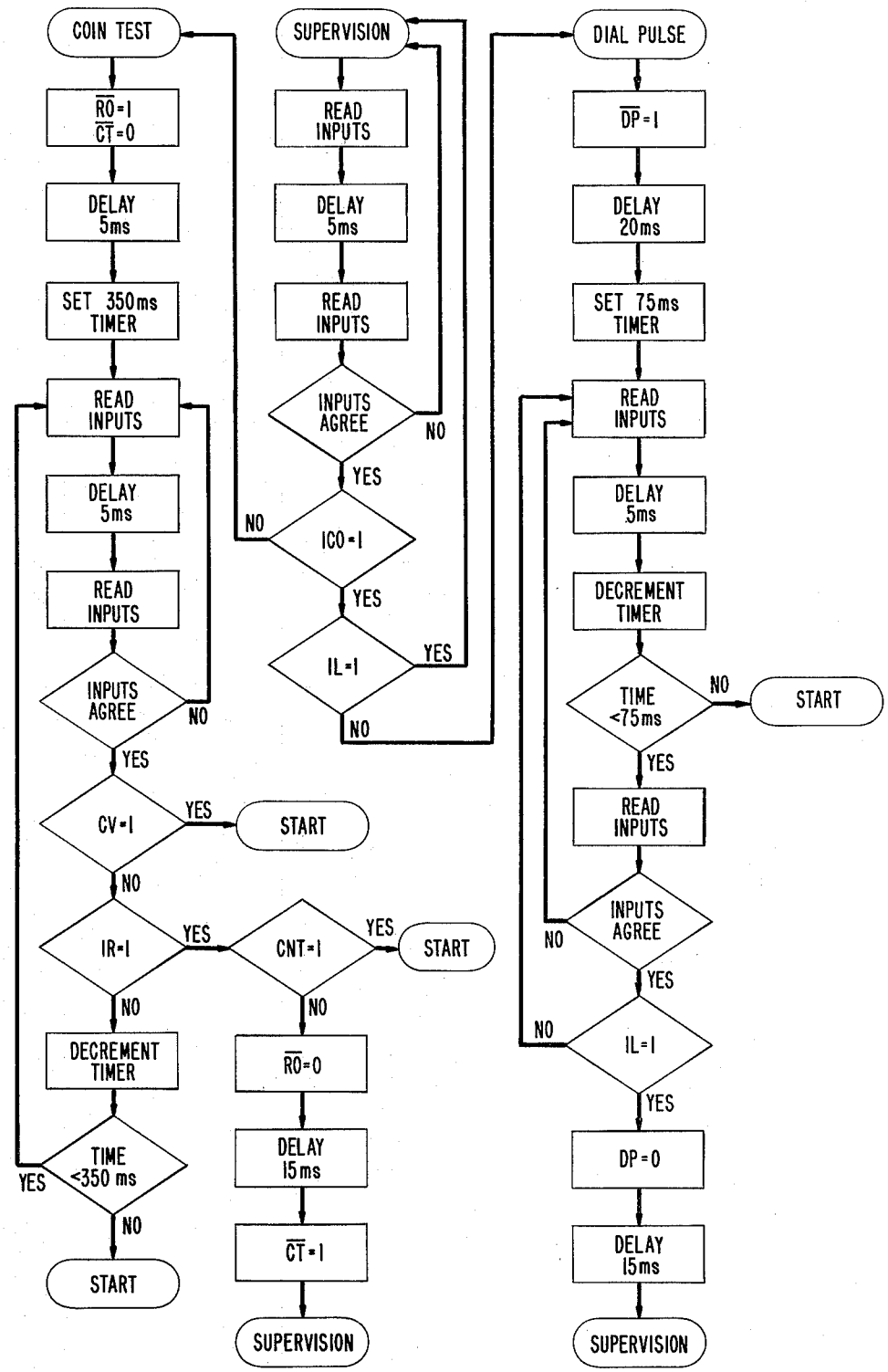
FIG. 7 is a flow chart of some other functions performed by control circuit 20 of FIG. 1 not shown in FIG. 6.

Ring current detector 18 is connected by lead 19 with a control circuit 20 where the "off-hook" condition is monitored. Control circuit 20 may be a hard-wired logic circuit or a microcomputer, either of which can be constructed to perform the sequence of functions shown in FIGS. 6 and 7. FIGS. 6 and 7 are also useful in understanding the further description of the coin REG of FIG. 1.

After detection of the off-hook condition, a high impedance coin voltage detector (CVD) 22 connected to tip conductor 11 by lead 21 is monitored by control circuit 20. The voltage on tip conductor 11 is compared with a reference voltage at the detector 22. If coins are to be collected at the coin telephone, a high voltage, usually +130 V d.c., will be applied from the central office to tip conductor 11. Likewise, when coins are to be returned, a high voltage, usually −130 V d.c., will be applied to tip conductor 11. If the magnitude of the high voltage is greater than the reference, a logic 1 will be transmitted to control circuit 20 on lead 90, and conductors 11,13 remain connected directly with conductors 15,17. Coin collection or return may also occur during a call, such as during overtime.

If no high voltage is detected at the coin voltage detector 22, control circuit 20 enables a plurality of relay drivers 24,26,28, thereby operating ground (G) relay 32, dial pulse (DP) relay 34, and repeater operate (RO) relay 36, respectively. Control circuit 20 also turns the floating line feed 52 on, via lead 39.

The operation of G relay 32 closes the G contacts 40, thereby connecting the grounded resistor 42 with ring conductor 13. Resistor 42 aids ground start by drawing current from the central office battery supply (not shown).

The operation of RO relay 36 disconnects conductors 11,13 from conductors 15,17, respectively, and, in conjunction with the operation of DP relay 34, inserts circuit 100 comprising the gain unit 58 and floating line feed 52 by the operation of the RO contacts 10,12,14 and 16. The operation of the RO contacts 10 and 12, in conjunction with the operation of DP contact 70, connects tip and ring conductors 11 and 13, respectively, with a polarity guard and detector 44. Reversals in central office battery are detected by the polarity guard and detector 44, which operates the polarity reversal (PR) relay 46, thereby operating the PR contacts 48,50. Operation of PR contacts 48,50 reverses the polarity of the floating line feed circuit 52 to track the central office battery reversals. Central office battery reversal must be accurately transmitted to a coin telephone to insure such functions as clearing the totalizer of the coin telephone, disabling the touch-tone pad during coin deposit by the caller to guard against fraud, and the like.

An office current detector 54, connected by lead 23 to the polarity guard and detector 44, detects the flow of current from the central office after operation of the RO contacts 10,12,14,16 and DP contact 70. Lead 25 connects the office current detector 54 with the control circuit 20. When office current is detected, the G relay 32 is de-energized by the control circuit 20, thereby opening G contact 40 and disconnecting grounded resistor 42 from the ring conductor 13.

Power supply 56 is connected to the office current detector 54 and to the polarity guard and detector 44 and ensures that direct current is supplied to the bidirectional amplifier 58. Power supply 56 also aids loop start and supervision by drawing current from the central office battery supply. Power supply 56 and bidirectional amplifier 58 are disclosed in U.S. Pat. No. 4,282,407, issued Aug. 4, 1980, and assigned to the same assignee as the application herewith. The gain of the bidirectional amplifier 58 is automatically set by the control circuit 20, via lead 27.

Bidirectional amplifier 58 is connected to line build-out and equalizer circuit 60. Line build-out to a standard electrical length provides high frequency impedance compensation. Equalization insures a uniform frequency response over the voice frequency bandwidth.

Line build-out and equalization circuit 60 is connected to the primary winding 64 of a transformer 62. Transformer 62 provides longitudinal isolation and thus protects circuit 100 and the central office against noise induced from power lines.

Surge diode 66, connected across the leads from equalizer 60, and surge diode 68, connected across the leads to polarity guard 44, protect against ringing and transient voltages.

The dial pulse (DP) contacts 70 are opened and closed by DP relay 34 in response to the opening and closing of the loop caused by dial pulsing, switchhook flashes, or on-hook from the coin telephone (not shown). The opening and closing of the loop at the coin telephone is detected at the loop current detector 86 and transmitted over lead 37 to the control circuit 20 which, in turn, operates the DP relay 34. This method of shaping and repeating dial pulses eliminates hits, split pulses and transients.

The loop conductors 15,17 are connected via RO contacts 14,16, respectively, to the secondary winding of transformer 62. The secondary winding of transformer 62 comprises two sections 78,80 connected together via capacitor 82. Such a nongrounded connection, combined with the self-limiting characteristic of line feed circuit 52, to be described hereinbelow, eliminates the need for devices such as thermistors or resistance lamps to protect the line feed circuit 52 and transformer 62. In REG units, it is common to connect one section of the secondary winding of transformer 62 through a capacitor to ground and the other section to a line feed voltage. Such an arrangement requires thermistors or resistance lamps (not shown). Elimination of such protection devices results in economic advantage and improved reliability. Further, elimination of this ground connection reduces circuit noise and corrosion, especially on coin first lines.

The secondary winding sections 78,80 of transformer 62 are also connected via PR contacts 48,50 to a floating line feed circuit 52. As described above, PR contacts 48,50 are operated by PR relay 46 so that the voltage from line feed circuit 52 tracks the central office voltage polarity reversals. Floating line feed circuit 52 is a self-adjusting device that provides a current to match the telephone set characteristics and also limits current flow in the event of a short circuit. Floating line feed circuit 52 is powered by a constant voltage supply 84 obtained from a regulator (not shown). Such a regulator is necessary to accept various levels of input voltage, which may vary with the type of central office, and to provide a constant voltage to line feed circuit 52 for accurate loop resistance measurement, as will be described below.

Output leads 31,33 connect floating line feed circuit 52 with detector 86. Detector 86 normally detects the presence or absence of loop current. When select lead 35 is de-energized by control circuit 20, however, loop resistance rather than loop current is monitored by detector 86. The output from detector 86 is transmitted via lead 37 to control circuit 20. This loop resistance signal is used by control circuit 20 to automatically adjust the gain of bidirectional amplifier 58 and will be described in detail hereinbelow.

When central office battery is removed from conductors 11,13, preparatory to the application of coin voltages for testing, coin collect or return, the office current detector 54 detects this state (because current ceases to flow) and transmits this state to control circuit 20. DP relay 34 and RO relay 36 are then deenergized, thereby releasing DP contact 70 and RO contacts 10,12,14,16 to remove circuit 100 from the loop and connect conductors 11,13 directly with conductors 15,17, respectively.

Under control of circuit 20, the CT relay 38 operates the double CT contacts 72. CT contacts 72, when closed, connect resistor 74 between tip conductor 11 and ground to draw current from the central office, thereby aiding coin tests. Operation of the CT contacts 72 also connects resistor 76 by way of lead 29 in shunt across tip conductor 11 and ring conductor 17. This shunt resistance 76 draws sufficient current, before circuit 100 is connected into the coin loop, to prevent fast responding electronic switching offices from registering erroneous dial pulses.

If a coin control voltage is detected at the coin voltage detector 22, a logic 1 is transmitted to control circuit 20 as described hereinabove. CT relay 38 is deenergized to prevent resistors 74 and 76 from drawing current, thereby ensuring that current from the central office will be supplied directly to the coin telephone for collecting or returning coins.

At some time during a call, it is desirable to determine if the caller has deposited the correct amount of coins in the coin telephone. A coin test determines if this deposit has been made by applying, in most central offices, a voltage on the tip conductor 11 with the ring conductor 13 open. To aid the central office in detecting the presence of coins, a resistor 74 is connected between the tip conductor 11 and ground by closing the CT contacts 72.

In some coin first, step-by-step central offices, however, a coin test voltage is applied on the ring conductor 13 with the tip conductor 11 connected through a high resistance to ground (not shown). Here, the test is aided by closing the G contact 40, thereby connecting resistor 42 between ring conductor 13 and ground.

It is necessary, then, to determine whether a coin test is to be made on the tip conductor 11 or the ring conductor 13 in order to operate either CT contacts 72 or G contact 40. One method of making this determination is by the operation of coin test (CNT) switch 88. CNT switch 88 is open in all cases except in central offices where a coin test is performed on the ring conductor 13. Ground is connected to lead 41 by control circuit 20. If the CNT switch 88 is closed, this ground condition is returned via lead 43 to the control circuit 20 for storage, and the G contact 40 will be operated later in the call. If CNT switch 88 is open, ground will not be detected at the control circuit 88 and CT contact 72 will be operated. It may be noted that the ground test on lead 43 is performed at the beginning of a call when RO contacts 10,12,14,16 are not operated and office current is not being detected by OCD 54, thus permitting the transmission of two separate conditions over lead 43: the test on lead 43 at the beginning of a call, and, the flow of office current after circuit 100 is inserted into the coin loop.

RING CURRENT DETECTOR

Figure 2:
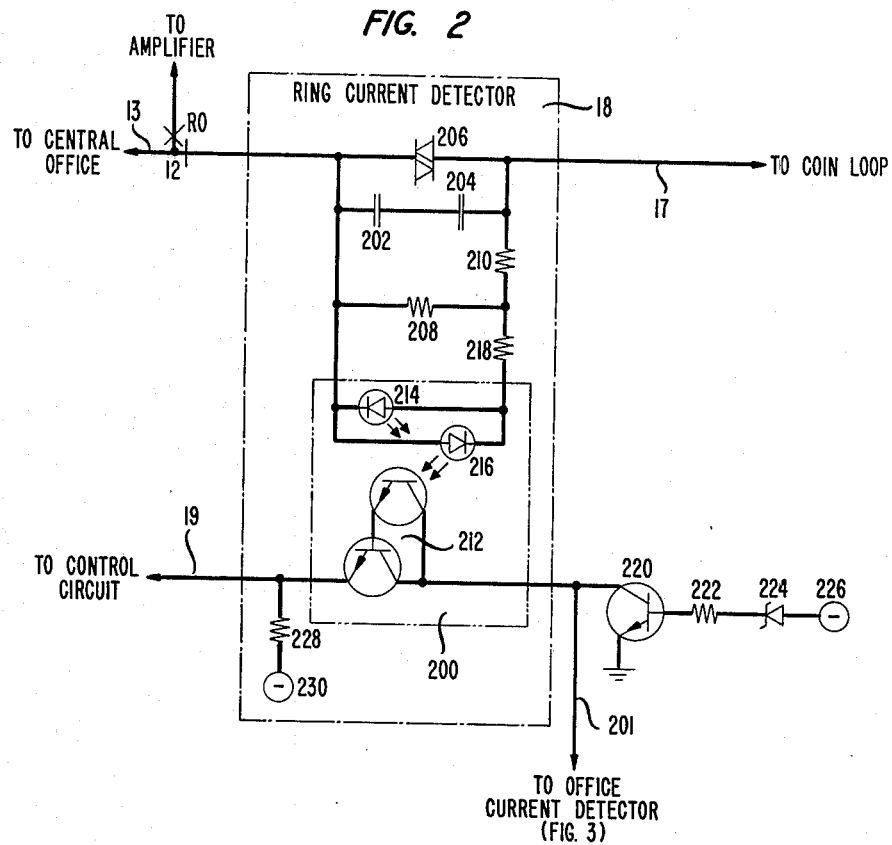
FIG. 2 is the ring current detector (RCD) shown in FIG. 1.

Referring to FIG. 2, there is shown the ring current detector 18 of FIG. 1. In the idle state or during ringing, the central office (not shown) is connected by ring conductor 13 through normally closed RO contacts 12 to the ring current detector 18. Ring current detector 18 is connected to the loop and coin telephone (not shown) through ring conductor 17. When the caller from the coin telephone goes off-hook, current flows through one of the light-emitting diodes 214 or 216 (depending on current polarity) thereby turning on the Darlington pair of transistors 212 of the opto-isolator 200. RCD 18 also detects current when supervision is reapplied at the central office following a coin test on tip conductor, coin disposal, or open intervals during which the central office performs switching functions. In addition, RCD 18 senses current during a coin test on ring conductor 13 when coins are present in the coin telephone.

When current above a threshold value flows through the RCD 18, logic 1 is transmitted over lead 19 to the control circuit 20 of FIG. 1. If the output from the coin voltage detector 22 is logic 0, RO delay 36 is energized, thereby operating RO contacts 10,12,14,16 of FIG. 1 to insert circuit 100 into the path of the loop.

Capacitors 202,204 and resistors 208,210 provide a low impedance path for 20 Hz ringing currents to flow through the detector 18. Similarly, large d.c. transient voltages and 60 Hz loop currents are also bypassed, thereby protecting opto-isolator 200. Varistor 206 protects the large capacitors 202,204 and, in conjunction with resistor 218, also protects the light emitting diodes 214,216. Resistors 208 and 210, connected across the capacitors 202,204, also provide a high DC threshold and time constant to inhibit the Darlington pair of transistors 212 from being turned on due to ringing currents with the telephone set on-hook. Resistance 208, however, is made sufficiently small to detect off-hook on the longest loops.

The collector electrodes of the Darlington pair of transistors 212 are connected to the collector of transistor 220. The collector of transistor 220 is also connected to the office current detector 54 of FIG. 1 by lead 201. The emitter of transistor 220 is connected to ground. The base of transistor 220 is connected through resistance 222 and zener diode 224 to voltage supply 226. Supply voltage 226 is obtained from a regulator (not shown) which accepts any central office input voltage and provides a constant output voltage. Such a supply voltage also powers the floating line feed circuit as described hereinabove.

If voltage supply 226 fails or should the voltage fall below the threshold value set by zener diode 224, the lower base current will turn transistor 220 off, thereby disconnecting ground from the collector of the Darlington transistors 212. When transistor 220 is turned off, the two current detectors 18 and 54 of FIG. 1 are disabled. Such a disabling of the current detectors 18 and 54 is interpreted by control circuit 20 to mean that the caller has gone on-hook and circuit 100 remains disconnected from the loop until the supply voltage 226 is restored. Thus, conductors 11,13 remain connected directly with conductors 15,17 during this period, thereby providing fail-safe operation.

If this feature were not provided, and the collector electrodes of Darlington transistors 212 were connected directly to ground, when the supply voltage failed, the circuit 100 would be removed from the connection by the operation of the RO relay 36 and RO contacts 10,12,14,16 by control circuit 20. As central office battery remains connected to the coin loop, ring current detector 18 will convey this condition to the control circuit 20. RO relay 36 will be operated to insert circuit 100 in the loop. Because supply voltage 226 has failed, circuit 100 will again be removed. RO relay 36 thus uncontrollably opens and closes the RO contacts 10,12,14,16, putting the line completely out of service and possibly damaging the unit.

As stated earlier, the emitters of the Darlington pair of transistors 212 are connected to lead 19. Also connected to lead 19 are resistor 228 and a small voltage supply 230, on the order of −5 V. If current is detected, ground appears on lead 19 and logic 1 is transmitted to control circuit 20; if no current is detected, negative voltage appears on lead 19 and logic 0 is transmitted to control circuit 20.

The sensitive opto-isolator 200 functions to protect the control circuit 20 against high voltages, to provide high resistance to ground so as not to interfere with insulation testing of the loop, and to detect low threshold currents of either polarity for long loops.

OFFICE CURRENT DETECTOR

Figure 3:
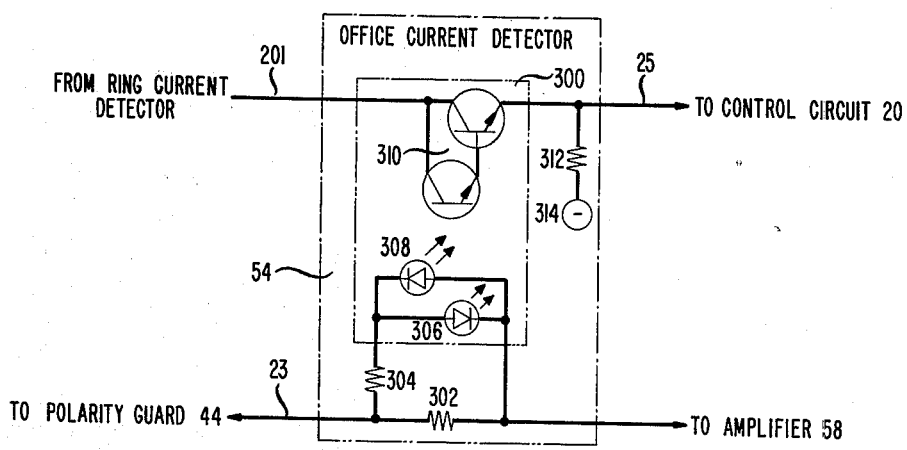
FIG. 3 is the office current detector (OCD) shown in FIG. 1.

Referring to FIG. 3, there is shown in detail the office current detector 54 of FIG. 1. Connected in series with tip conductor 23 to the central office (not shown) is a resistor 302, also connected to resistor 304 which limits the current flow through a pair of light emitting diodes 306,308. When the RO relay 36 of FIG. 1 is operated to insert the bidirectional amplifier 58 and the line feed circuit 52 into the coin loop, current from the central office flows through the detector 54 and particularly through the diodes 306,308, thereby emitting light. The light thus emitted supplies the base current to turn on a Darlington pair of transistors 310. The collectors of the Darlington pair of transistors 310 are connected by lead 201 to the transistor 220 of FIG. 2.

Resistor 312 and a low voltage source 314, on the order of −5 V, are connected via lead 25 to the emitter electrodes of the Darlington pair 310. When the Darlington pair 310 is turned on, logic 1 is transmitted from the opto-isolator 300 over lead 25 to the central circuit 20, when the Darlington pair 310 is off, logic 0 is transmitted.

FLOATING LINE FEED

Figure 4:
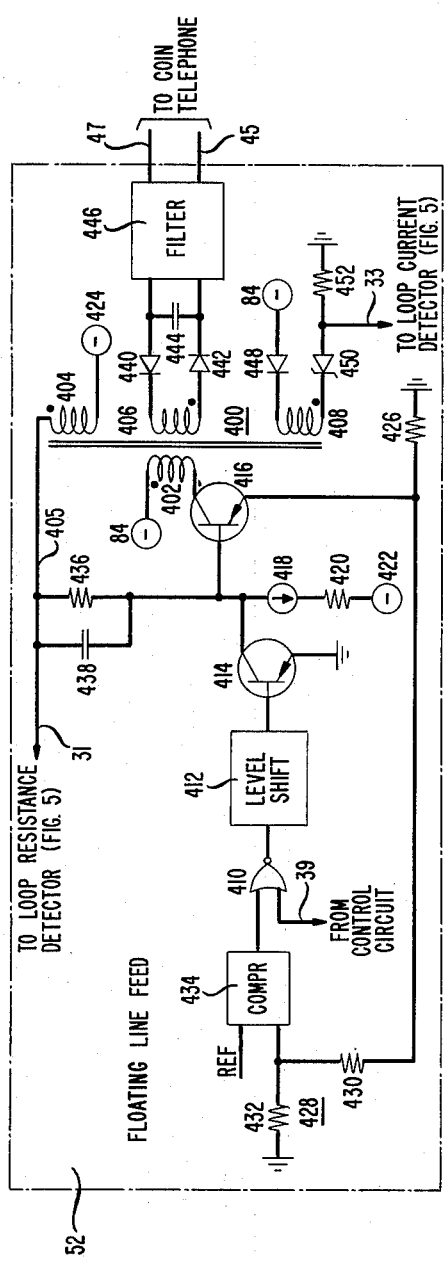
FIG. 4 is the floating line feed circuit shown in FIG. 1.

The floating line feed circuit 52 of FIG. 1 is shown in detail in FIG. 4. The line feed circuit 52 uses a transformer 400 which is similar to that disclosed in U.S. Pat. No. 4,056,689, granted Nov. 1, 1977 to L. Freimanis and assigned to the same assignee as the application herewith.

In the idle state, logic 1 is transmitted over lead 39 from control circuit 20 to the NOR gate 410, the output of which is connected to the level shift 412 to turn on the transistor 414. When transistor 414 is turned on, switching transistor 416 is turned off, thereby blocking the flow of current through the primary winding 402 of the transformer 400 to the voltage supply 84.

When an off-hook condition is transmitted from ring current detector 18 to control circuit 20, a logic 0 is transmitted on lead 39 to NOR gate 410, and level shift 412 operates to turn off the transistor 414. Current flowing from voltage source 422, through resistor 420 and current source 418 is applied to the base of switching transistor 416, thereby turning on transistor 416. Current flows through grounded resistor 426, transistor 416, primary winding 402 to the voltage supply 84. This current flow through the primary winding 402 increases linearly, transferring energy to the transformer 400. Simultaneously, the emitter voltage of transistor 416 decreases linearly due to the voltage drop across the resistor 426. While current flows through the primary winding 402, the voltage across the output winding 406 reverse-biases diodes 440 and 442 so that no current flows in the output winding 406.

The emitter of transistor 416 is also connected to a voltage divider 428 comprising resistors 430 and 432.

The midpoint of voltage divider 428 is connected to a comparator 434; the other end of the voltage divider 428 is connected to ground. When the value of the current through the primary winding 402 reaches a predetermined value, the voltage across resistor 432 drops below the reference input to the comparator 434, thereby generating an output from the comparator 434 to switch on the transistor 414, disabling the switching transistor 416.

Secondary winding 404 provides a feedback current over lead 405 through resistor 436 and capacitor 438, connected in parallel, to current source 418 and to the base of transistor 416 to keep transistor 416 off after the transistor 414 is turned off. Secondary winding 404 is also connected to detector 86 via lead 31 for determining the loop resistance and will be described in detail hereinbelow.

When the current in the primary winding 402 falls to zero, the voltage across output winding 406 reverses, diodes 440 and 442 conduct, and the energy stored in transformer 400 is discharged into the capacitor 444.

As mentioned hereinabove, diodes 440 and 442 block current flow in the secondary winding 406 when current flows through the primary winding 402. Integrating capacitor 444, connected across the leads from diodes 440 and 442, charges when the primary 402 is not conducting and discharges when the primary 402 is conducting, thereby maintaining a substantially constant voltage at the output. Connected across capacitor 444, filter 446 has two functions: first, it provides high voice frequency impedance to signals on the coin loop, and, second, it attenuates high frequency signals appearing on leads 45 and 47, thereby providing direct current over leads 45,47 to the coin loop, via conductors 15,17, without affecting operation of the amplifier 58 or interfering with analog or digital carrier systems on other loops in the same cable in which the conductors 15,17 are located.

The period of discharge through the secondary winding 406 depends on the impedance of the coin loop. On short loops (low impedance), or in case of a short circuit, the discharge is slow and on long loops (high impedance) the discharge is rapid, i.e. the frequency of discharge of transformer 400 is a function of the loop resistance and is disclosed more fully in the Freimanis patent mentioned hereinabove. When the discharge is complete, transformer voltages reverse, transistor 416 is turned on by the feedback winding 404 and current source 418, and current from voltage supply 84 again flows through the primary winding 402.

A third secondary winding 408 of transformer 400 is connected at one end to a diode 448 and voltage supply 84 and, at the other end, with a zener diode 450, grounded resistance 452, and via lead 33 to the loop current detector 86 of FIG. 1. During dial pulsing and switchhook operation, when the voltage across the secondary winding 408 exceeds the sum of the voltage of source 84 and the voltage across zener diode 450, current flows through the secondary winding 408. Thus, the voltages across secondary windings 406 and 408 are clamped and energy is returned to source 84. The circuitry associated with the secondary winding 408 acts as a safety device and power conserver.

The loop current delivered by the transformer 400 varies from 43 mA at 40 KHz for short circuit to about 21 mA at 90 KHz for full load i.e., about 3600Ω comprising 2800Ω max. loop length and 800Ω for the coin telephone during totalizer read out.

LOOP RESISTANCE/LOOP CURRENT DETECTOR

Figure 5:
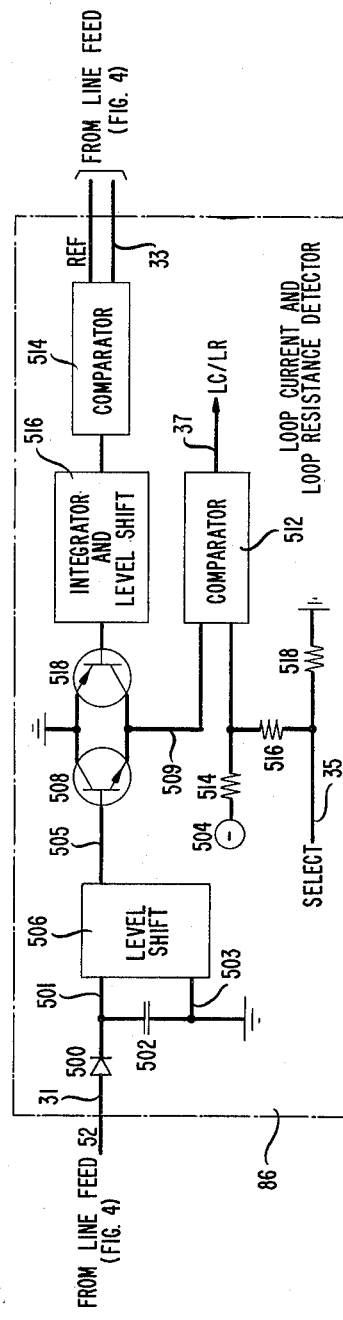
FIG. 5 is the loop current and loop resistance detector shown in FIG. 1.

Referring to FIG. 5, there is shown the loop current and loop resistance detector 86 of FIG. 1. Lead 31 connects the secondary winding 404 of FIG. 4 with diode 500. Diode 500 is connected with level shift circuit 506 via lead 501. The output from diode 500 is also connected to one end of capacitor 502. The other end of capacitor 502 is connected to ground and to the level shift circuit 506 via lead 503. Diode 500 and capacitor 502 operate as a peak voltage detector. The level shift circuit 506 controls transistor 508 via lead 505. The collector of transistor 508 is connected with ground. The emitter electrode of transistor 508 is connected to comparator 512. The emitter voltage of transistor 508 is proportional to the loop resistance below $3000\Omega$.

When off-hook is detected at control circuit 20 of FIG. 1 and RO relay 36 is operated to close RO contacts 10,12,14,16, the loop resistance is measured. This measurement is initiated at control circuit 20 when select lead 35 is opened, thereby setting the threshold of the comparator 512 at $2300\Omega$ comprising $2000\Omega$ for the loop and $300\Omega$ for the coin telephone set. Resistance 518 is selected during manufacture to calibrate the detector.

Select lead 35 connects control circuit 20 with the junction of resistors 516 and 518. The other ends of resistors 518 and 516 are connected with ground and comparator 512, respectively. A small voltage 504 is connected to one end of resistor 514, the other end of which is connected to resistor 516 and to comparator 512.

If the resistance of the coin loop and the coin telephone exceeds a threshold value of $2300\Omega$, the output lead 37 from comparator 512 to control circuit 20 will be enabled. A logic 1 will then be transmitted from control circuit 20 over lead 27 of FIG. 1 to set the gain of the bidirectional amplifier 58 to 6 dB. If the combined coin loop and coin telephone resistance is below $2300\Omega$, a logic 0 is transmitted, causing the gain of the bidirectional amplifier 58 to remain unchanged at 3 dB.

Referring again to FIG. 5, the detector may be set to detect the presence or absence of loop current during dial pulsing, i.e., due to the make or break of the switchhook contacts, or during switchhook flashes. During a make, the loop resistance is less than $3600\Omega$; during a break the loop is open and the resistance is larger than $30,000\Omega$. Select lead 35 is normally grounded by control circuit 20, thereby setting the reference to comparator 512 at about $10,000\Omega$ by effectively disconnecting resistance 518. The presence or absence of loop current may be used to detect signals from a coin telephone such as off-hook, dial pulsing, switchhook flashes and on-hook. Loop current must be present for circuit 100 to be active.

When the voltage across the secondary winding 408 (FIG. 4) exceeds the sum of the voltage of supply 84 and the voltage across the zener diode 450, voltage pulses will be transmitted on lead 33 to the comparator 514, which operates to pass these voltage pulses through integrator and level shift 516 and turn transistor 518 on by supplying d.c. base current. When transistor 518 is turned on, the voltage applied to comparator 512 exceeds the reference voltage, thereby transmitting a logic 0 on the output lead 37.

When current begins to flow through the loop and the coin telephone (not shown), the resistance of the loop is below $3600\Omega$. A logic 1 is transmitted over lead 37 to control circuit 20. When the resistance is above $3600\Omega$, a logic 0 is transmitted. By this means, the make and break intervals of dial pulsing are monitored by control circuit 20 and are used to operate the dial pulse (DP) relay 34. DP relay 34, in turn, opens and closes the DP contacts 70 to transmit well-shaped dial pulses to the central office. RO relay 36 remains energized during dial pulsing. Switch hook flashes are likewise repeated. When on-hook is detected, i.e., when there is no current flow for over 100 ms, all relays are released and circuit 100 is disconnected from the loop.

Referring to FIG. 6, there is shown a flow chart for the initialization, idle, off-hook detection, ground start, and amplifier automatic gain control functions performed by the control circuit 20 of FIG. 1. The sequence in which these functions are performed is indicated by the flow chart, shown in sufficient detail to permit one skilled in the art to duplicate circuit 20 of FIG. 1, either by programming a microprocessor or by special purpose logic circuitry. Whereas the flow chart shows delay times used in a particular application, it is readily apparent that it would be a simple matter to change the delay times for any other application.

Referring to FIG. 7 there is shown a flow chart for coin testing, supervision, and dial pulsing sequence of functions performed by the control circuit 20 of FIG. 1. The sequence of functions are presented in sufficient detail in FIG. 7 to permit one skilled in the art to duplicate the control circuit 20 of FIG. 1. FIGS. 6 and 7 together show the function performed by control circuit 20 of FIG. 1 and which functions are required to control the operation of the coin REG of FIG. 1. It would be a simple matter to change the delay times to suit a different application.

We claim:

1. A method of controlling a coin telephone from a central office over a coin subscriber loop
    characterized by the steps of
    detecting the flow of current through a single conductor in said coin subscriber loop,
    detecting the absence of coin control signal voltages, and
    in response to said current and voltage detection, inserting an amplifier circuit (100) and a line feed circuit (52) into said coin subscriber loop.

2. The method of controlling the coin telephone according to claim 1 further
    characterized by the steps of
    detecting the application of said coin control signals from said central office, and
    directly connecting said central office with said coin telephone, thereby bypassing said amplifier circuit (100) and said line feed circuit (52).

3. The method of controlling the coin telephone according to claim 1 further
    characterized by the step of
    relaying polarity reversals from said central office around said amplifier circuit (100) to said coin telephone.

4. The method of controlling the coin telephone according to claim 1 further
    characterized by the step of
    aiding said central office in detecting the state of said coin telephone by drawing current from said central office for either the loop-start or the ground-start method of detection of call origination.

5. A method of controlling a coin telephone from a central office over a coin subscriber loop
characterized by the steps of
detecting the removal of current from said central office to said coin loop,
disconnecting an amplifier circuit (100) and a line feed circuit (52) from said coin loop in response to said removal of current, and
simultaneously directly connecting said central office with said coin loop.

6. The method of controlling the coin telephone according to claim 5 further
characterized by the step of
drawing current from said central office in response to coin test voltages to enable detection of the presence of coins in said coin telephone.

7. Apparatus for range extension of direct current supervisory signals and for providing gain for voice frequency signals for a telephone subscriber loop connecting a central office with a coin telephone
characterized by
means (18) for detecting current flow through one conductor (13,17) in said loop in response to a change in state of said coin telephone,
means (22) for detecting the absence of coin control signals transmitted from said central office to said coin telephone, and
means (20) responsive to said current and control signal detecting means for connecting an amplifier circuit (100) and a line feed circuit (52) with said loop.

8. The apparatus according to claim 7 further characterized by
means responsive to said current and voltage detecting means for connecting a grounded resistor (42) with a conductor (11 or 13) in said loop.

9. The apparatus according to claim 7 further characterized by
means (26,34) for relaying dial pulses from said coin telephone to said central office.

10. The apparatus according to claim 7 further characterized by
means (88,20) for determining whether a coin test should be performed on a ring conductor (13) or on a tip conductor (11), and
means (42,74) for aiding said coin test.

11. A coin range extender with gain for coin telephone loops, said range extender including means (18,20) responsive to current in said loop for inserting a voice frequency gain device (58) into said loop, said extender
characterized by
means (22,54) for detecting coin control voltages, and
means (20) responsive to said detecting means for removing said device from said loop.

* * * * *

UNITED STATES PATENT AND TRADEMARK OFFICE
CERTIFICATE OF CORRECTION

PATENT NO. : 4,323,733

DATED : April 6, 1982

INVENTOR(S) : Henry W. Ott and Bernard A. Tilson

It is certified that error appears in the above—identified patent and that said Letters Patent is hereby corrected as shown below:

Column 2, line 1, "touch-tone" should read --TOUCH-TONE®--.

Column 3, line 39, "touch-tone" should read --TOUCH-TONE--.

Column 6, line 11, "delay" should read --relay--.

Signed and Sealed this

Seventeenth Day of August 1982

[SEAL]

Attest:

Attesting Officer

GERALD J. MOSSINGHOFF

Commissioner of Patents and Trademarks